US007000709B2

(12) United States Patent
Milbourne

(10) Patent No.: US 7,000,709 B2
(45) Date of Patent: Feb. 21, 2006

(54) SIDE HANDLES ON DRILL/DRIVERS

(75) Inventor: Rodney Milbourne, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/852,725

(22) Filed: May 24, 2004

(65) Prior Publication Data

US 2005/0000714 A1 Jan. 6, 2005

Related U.S. Application Data

(63) Continuation of application No. 10/612,384, filed on Jul. 2, 2003, now Pat. No. 6,776,244, which is a continuation of application No. 10/028,461, filed on Dec. 20, 2001, now Pat. No. 6,595,300.

(51) Int. Cl.
*B23B 45/02* (2006.01)

(52) U.S. Cl. ...................... 173/170; 173/176; 173/217; 16/431; 310/50; 408/241 R

(58) Field of Classification Search ................ 173/170, 173/48, 216, 217, 176, 178, 47; 81/177.4, 81/177.6, 438, 439; 310/47, 50; 408/241 R, 408/241 S, 56; 16/426, 431
See application file for complete search history.

(56) References Cited

U.S. PATENT DOCUMENTS

| | | | | |
|---|---|---|---|---|
| 2,545,659 A | | 3/1951 | Ginter | |
| 2,976,436 A | | 3/1961 | Anton | |
| 3,148,568 A | | 9/1964 | Hoza | |
| 3,456,740 A | * | 7/1969 | Bronnert et al. | 173/109 |
| 3,537,336 A | | 11/1970 | Schmuck | |
| 4,276,675 A | | 7/1981 | Pioch | |
| 4,368,556 A | * | 1/1983 | Wanner et al. | 16/436 |
| 4,410,846 A | | 10/1983 | Gerber et al. | |
| 4,418,766 A | | 12/1983 | Grossmann | |
| 4,448,261 A | | 5/1984 | Kousek et al. | |
| 4,479,555 A | | 10/1984 | Grossmann et al. | |
| 4,503,425 A | | 3/1985 | Gerber et al. | |
| D279,862 S | | 7/1985 | Sato et al. | |
| 4,689,534 A | | 8/1987 | Gerber et al. | |
| 4,820,090 A | | 4/1989 | Chen | |
| 4,978,257 A | | 12/1990 | Nowman | |
| 5,049,012 A | | 9/1991 | Cavedo | |
| D320,918 S | | 10/1991 | Mochida | |
| D337,712 S | | 7/1993 | Cavedo | |
| 5,671,815 A | | 9/1997 | Kabatnik et al. | |
| 5,690,451 A | | 11/1997 | Thurler et al. | |
| 5,881,823 A | | 3/1999 | Kabatnik et al. | |
| 5,996,707 A | | 12/1999 | Thome et al. | |
| D426,760 S | | 6/2000 | Schultz | |
| D431,766 S | | 10/2000 | Zurwelle | |
| 6,142,242 A | * | 11/2000 | Okumura et al. | 173/48 |

(Continued)

FOREIGN PATENT DOCUMENTS

| | | |
|---|---|---|
| DE | 8002633 | 7/1980 |

(Continued)

*Primary Examiner*—Scott A. Smith
(74) *Attorney, Agent, or Firm*—Harness, Dickey & Pierce, P.L.C.

(57) ABSTRACT

A drill/driver is provided that includes a housing, a collar mounted at a front portion of the housing, a side handle mounting area provided forward of the collar, a handle mounted to the side handle mounting area, and a chuck mounted forward of the side handle mounting area. With the side handle mounted in front of the collar, easier access to the adjusting collar and easier reading of the collar settings is achieved.

5 Claims, 6 Drawing Sheets

U.S. PATENT DOCUMENTS

| | | | | |
|---|---|---|---|---|
| 6,213,224 | B1 | 4/2001 | Furuta et al. | |
| 6,241,594 | B1 | 6/2001 | Lepold | |
| D447,032 | S | 8/2001 | Schoen et al. | |
| 6,484,361 | B1 * | 11/2002 | Schmid et al. | 16/110.1 |
| 6,609,860 | B1 * | 8/2003 | Wanek et al. | 408/14 |
| D487,686 | S * | 3/2004 | Milbourne | D8/70 |
| 6,776,244 | B1 * | 8/2004 | Milbourne | 173/170 |

FOREIGN PATENT DOCUMENTS

| | | | |
|---|---|---|---|
| DE | 19619023 | A1 | 11/1997 |
| DE | 19717031 | C1 | 10/1998 |
| DE | 19950807 | A1 | 5/2000 |
| TW | 257108 | | 11/1995 |
| TW | 381518 | | 1/2000 |

* cited by examiner

SIDE HANDLES ON DRILL/DRIVERS

CROSS-REFERENCE TO RELATED APPLICATIONS

This application is a continuation of U.S. patent application Ser. No. 10/612,384 filed on Jul. 2, 2003 now U.S. Pat. No. 6,776,244, which is a continuation of U.S. patent application Ser. No. 10/028,461 filed on Dec. 20, 2001 now U.S. Pat. No. 6,595,300. The disclosures of the above applications are incorporated herein by reference.

FIELD OF THE INVENTION

The present invention relates to power tools, and more particularly, to a power drill, driver, or hammer drill having a side handle arrangement.

BACKGROUND OF THE INVENTION

A typical power drill or driver includes a housing, a spindle, and a chuck for holding a drill bit or screwdriver. The housing typically includes a portion which contains an electric motor, a pistol-like grip for holding the drill, and a trigger switch for turning the drill on and off so as to supply torque to the drill bit or screwdriver for drilling a hole and inserting or removing a screw or the like. However, sometimes it is particularly difficult to gain enough leverage on the drill with the pistol-like grip alone. Therefore, power drills or drivers have been developed that further include a side handle so that the user may use both hands when using the drill or driver to gain leverage.

There are also power drills or drivers that include means for changing speeds of the drill or means for applying variable torque to the drill bit or screwdriver. These power drills typically include a rotary collar or other switching device that can be rotationally moved to different settings such that the speed of the drill or a torque setting of the drill can be increased or decreased according to the type of task the drill is being used to perform. However, when a drill that contains either the means for changing speeds or means for applying variable torque also contains a side handle, the placement of the side handle may make it difficult to rotationally move the collar to different settings and also difficult to read the settings on the rotary collar.

SUMMARY OF THE INVENTION

With the above deficiency in mind, the present invention provides a drill or driver that includes a housing, a collar mounted at a front portion of the housing, a side handle mounting area provided forward of the collar, a handle mounted to the side handle mounting area, and a chuck mounted forward of the side handle mounting area. With the side handle mounted in front of the collar, easier adjustment of the collar and easier reading of the collar settings is achieved. In addition, because the handle mounting area can be made generally the same size as the chuck, the use of handles with industry standard size mounting collars is also permitted.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
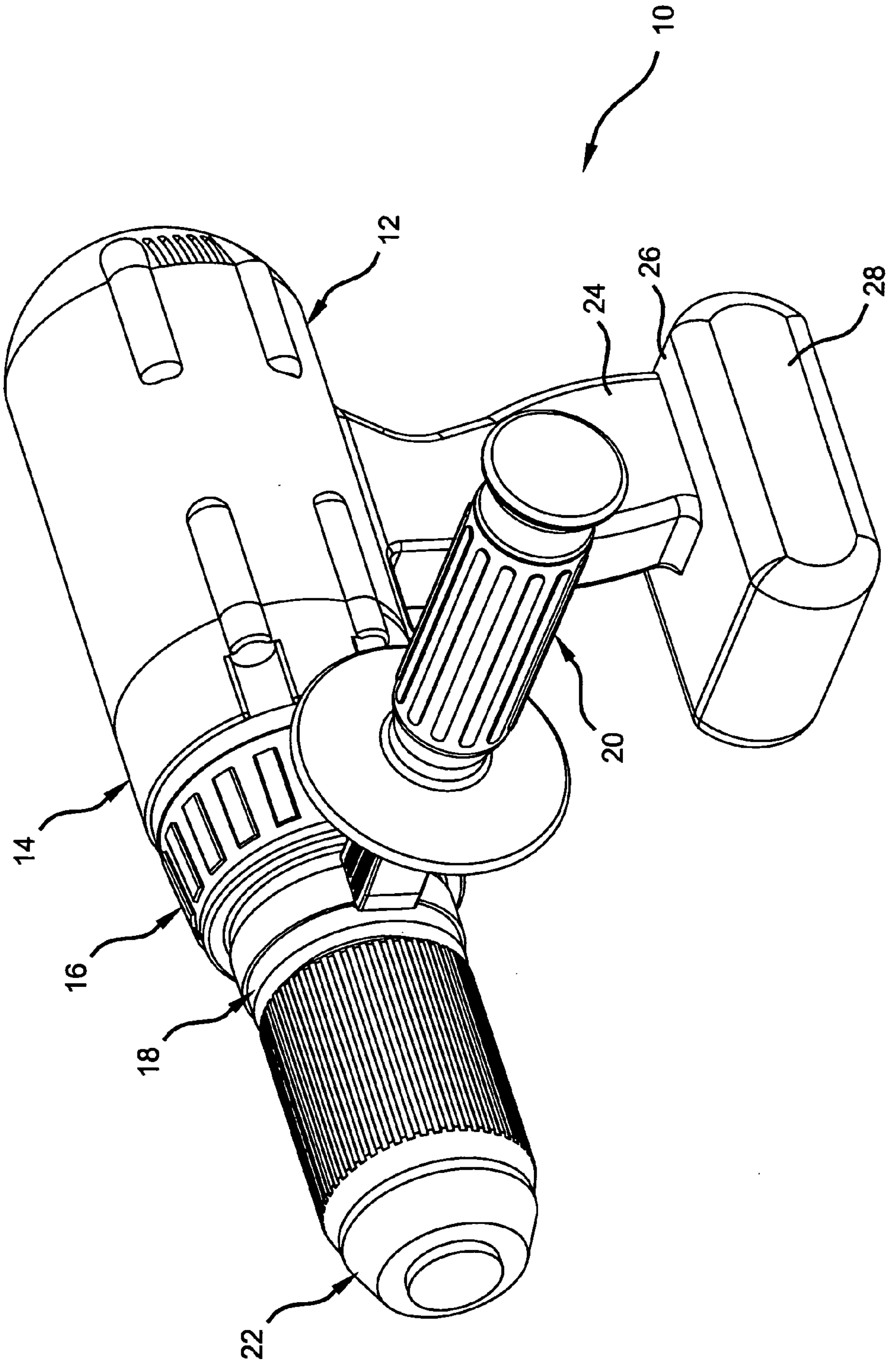
FIG. 1 is a perspective view of a tool with a side mounted handle.

FIG. 1 shows a tool 10, which can be a drill or driver, of the present invention. As can be seen in FIG. 1, the tool 10 includes a housing 12. A gear case cover 14 is mounted to the housing 12 and a collar 16 is rotatably mounted to the cover 14. A cap 18 is fixedly mounted to the gear case cover 14 and defines a side handle mounting area to provide an area to secure a side handle 20. A chuck 22 is mounted forward of the cap 18. The chuck 22 can be used to hold a drill bit or some other type of bit.

The housing 12 includes a pistol like grip 24 and a trigger switch (not shown) that is used to turn the tool 10 on or off. The housing 12 also has a wide base 26 that holds a battery pack 28. The housing 12 encloses an electric motor (not shown). Although the exemplary housing 12 shown contains these features, any housing known in the art may be used without affecting the scope of the invention.

Figure 2:
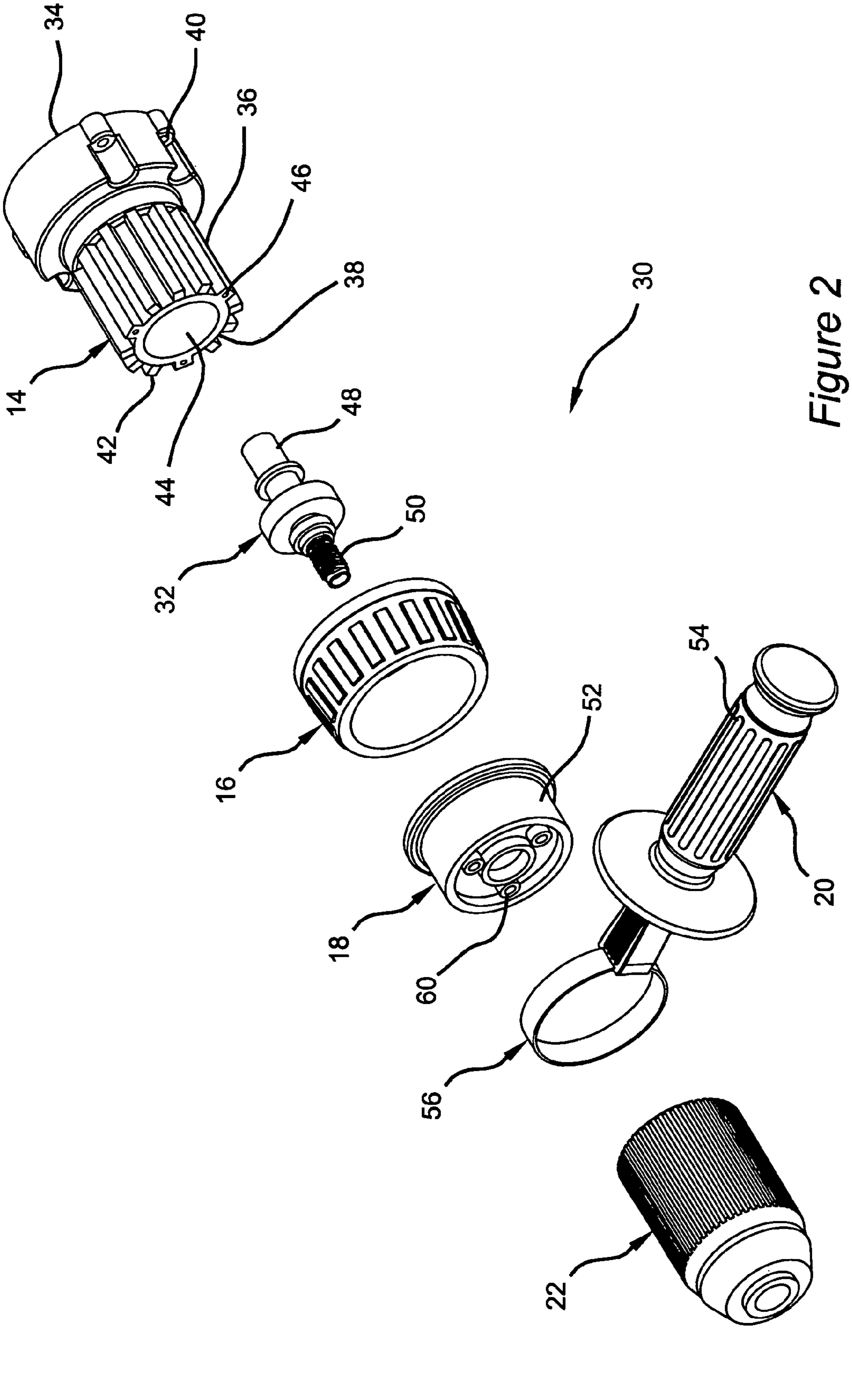
FIG. 2 is an exploded perspective view of a side handle arrangement for a tool.
Figure 5:
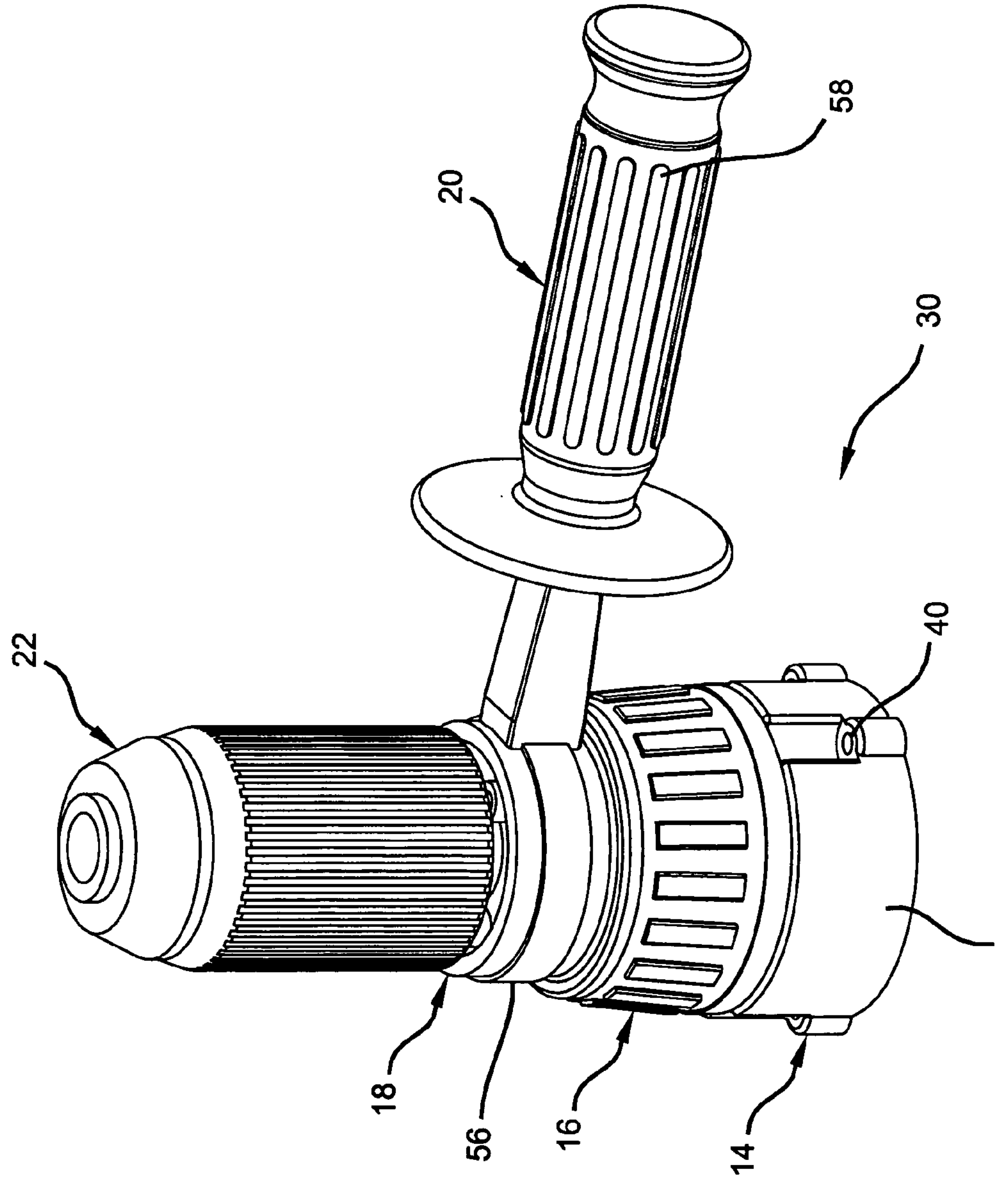
FIG. 5 is a perspective view of the side handle arrangement for a tool.

FIG. 2 is an exploded perspective view of a side handle arrangement 30 of the tool 10. The side handle arrangement 30 of the tool 10 includes the gear case cover 14 that is fixedly mounted to a front portion of the housing 12. A spindle 32 is rotatably supported within the cover 14 and has one end thereof extending through a front end of the cover 14. The collar 16 is rotatably mounted on an exterior portion of the cover 14. A cap 18 is mounted to the cover 14. A side handle 20 is mounted to the cap 18. A chuck 22 is mounted to the spindle 32 and completes the side handle arrangement 30. As shown in FIGS. 1 and 5, the chuck 22 has an outer diameter smaller than the cap 18 which has an outer diameter smaller than the collar 16.

The cover 14, which is metal, serves as a bearing support. The cover 14 has a rear portion 34 defining a wide base portion that is fixedly connected to the housing 12 by screws or the like through holes 40. A middle portion 36 of cover 14 has fins 42 that radially extend outward to mate with interior ribs of the cap 18. The cover 14 also has a hollow interior portion 44 that extends from a front portion 38 to the rear portion 34 for receiving the spindle 32 for allowing the spindle 32 to engage a clutch or gear assembly of a motor drive system (not shown) as is known in the art. The front portion 38 of the cover 14 also has threaded holes 46 to allow the cap 18 to be fixedly mounted onto the cover 14 by screws or the like.

A frontal portion 50 of the spindle 32 extends from the front portion 38 of the cover 14. The frontal portion 50 of the spindle 32 is adapted to allow the chuck 22 to be attached thereto. The chuck 22 can be any type of chuck that is known in the art.

The collar 16 is an annular plastic piece that fits over the middle portion 36 of the cover 14. The collar 16 is rotatably movable so as to allow the user of the tool 10 to choose different torque settings as is known in the art.

The cap 18, which is preferably made from metal, has a cylindrical outer surface 52 that defines a side handle mounting area. The cap 18 is hollow for receiving the front portion 38 of the cover 14 and includes an opening therethrough so as to allow the frontal portion 50 of the spindle 32 to extend outward from the cap 18.

The side handle 20 has a rubber or plastic grip 54 to allow the user to obtain a comfortable grip. The side handle also includes an annular mounting portion 56 that slides over the outer surface 52 of the cap 18 to secure the side handle 20 to the cap 18.

Figure 3:
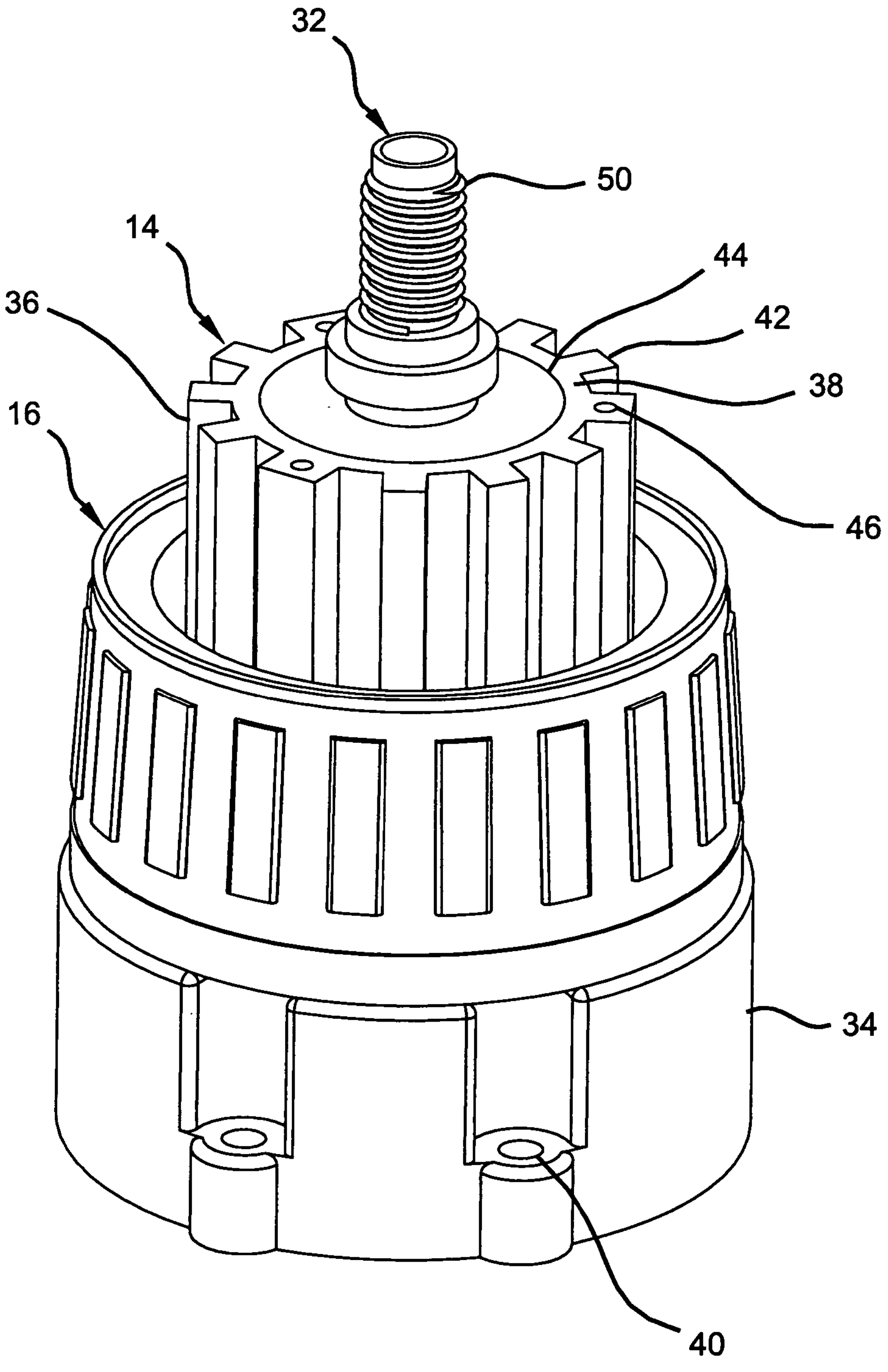
FIG. 3 is a perspective view of an arrangement of a cover, a collar, and a spindle of the side handle arrangement.

Referring to FIG. 3, it can be seen that during assembly, the spindle 32 is disposed in the hollow portion 44 of the cover 14 and extends from the front portion 38 of the cover 14. The collar 16 is mounted over the middle portion 36 of the cover 14 and is fitted against the rear portion 34 thereof.

Figure 4:
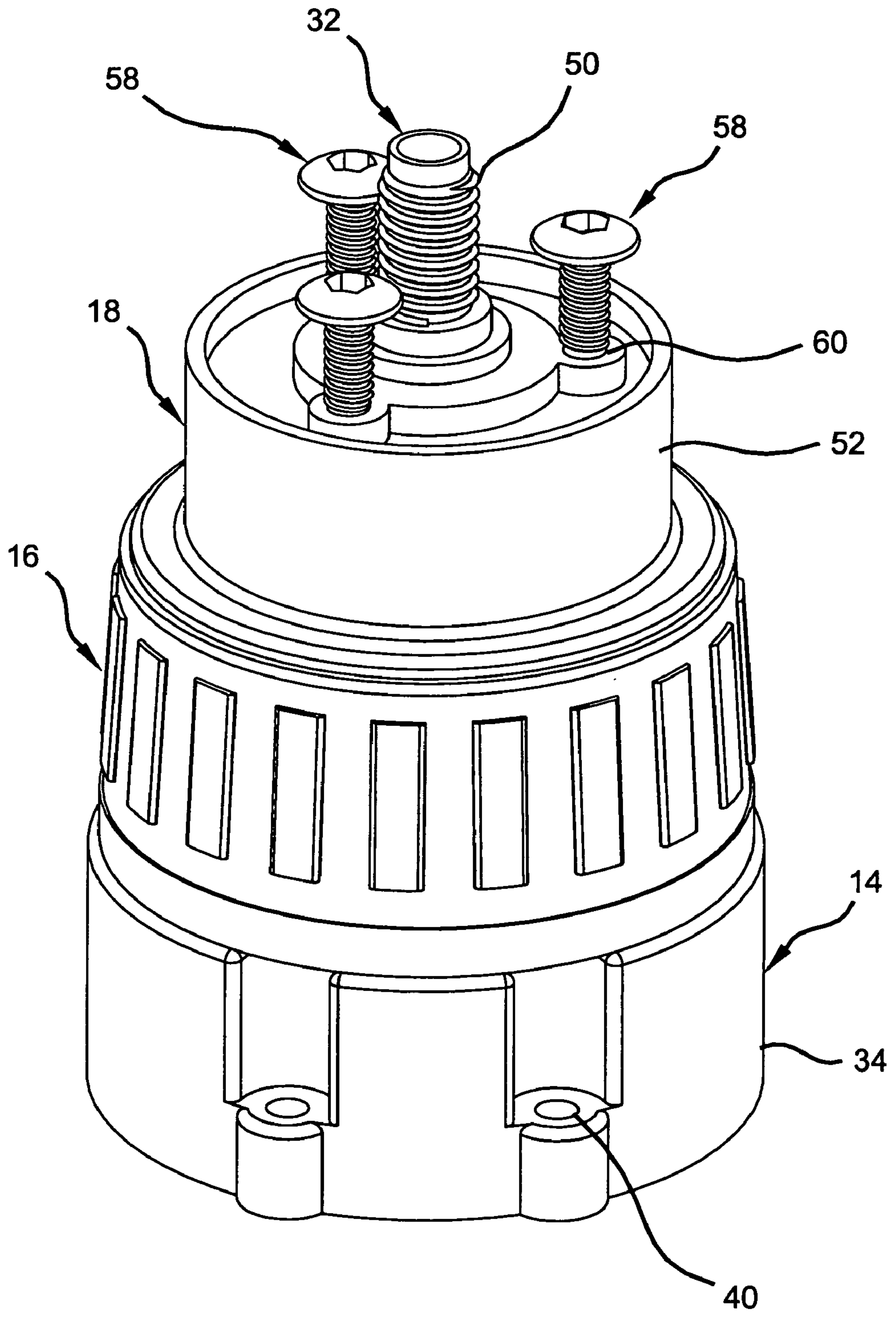
FIG. 4 is a perspective view of an arrangement of a cover, a collar, a spindle and a cap of the side handle arrangement.

As is shown in FIG. 4, the cap 18 is placed over the front portion 38 and onto the middle portion 36 of the cover 14 and is mounted to the cover 14 by screws 58 extending through holes 60, 46. The spindle 32 extends outward from the cap 18 so as to allow the chuck 22 to be mounted to the spindle 32. The side handle 20 is attached by the annular mounting portion 56 to the outer surface 52 of the cap 18.

FIG. 5 shows the final assembly of the side handle arrangement 30. The side handle 20 is located forward of the collar 16. This allows the user easier access to the collar 16, which makes it easier to rotationally move the collar 16 so as to achieve different torque settings and also makes the collar setting easier to read. The side handle 20 can also be rotated 360° to allow the user to select a number of different positions for the side handle 20. Particularly, the side handle 20 may be positioned so that the user may be right or left handed, or so that the tool 10 may be used in a confined space.

Figure 6:
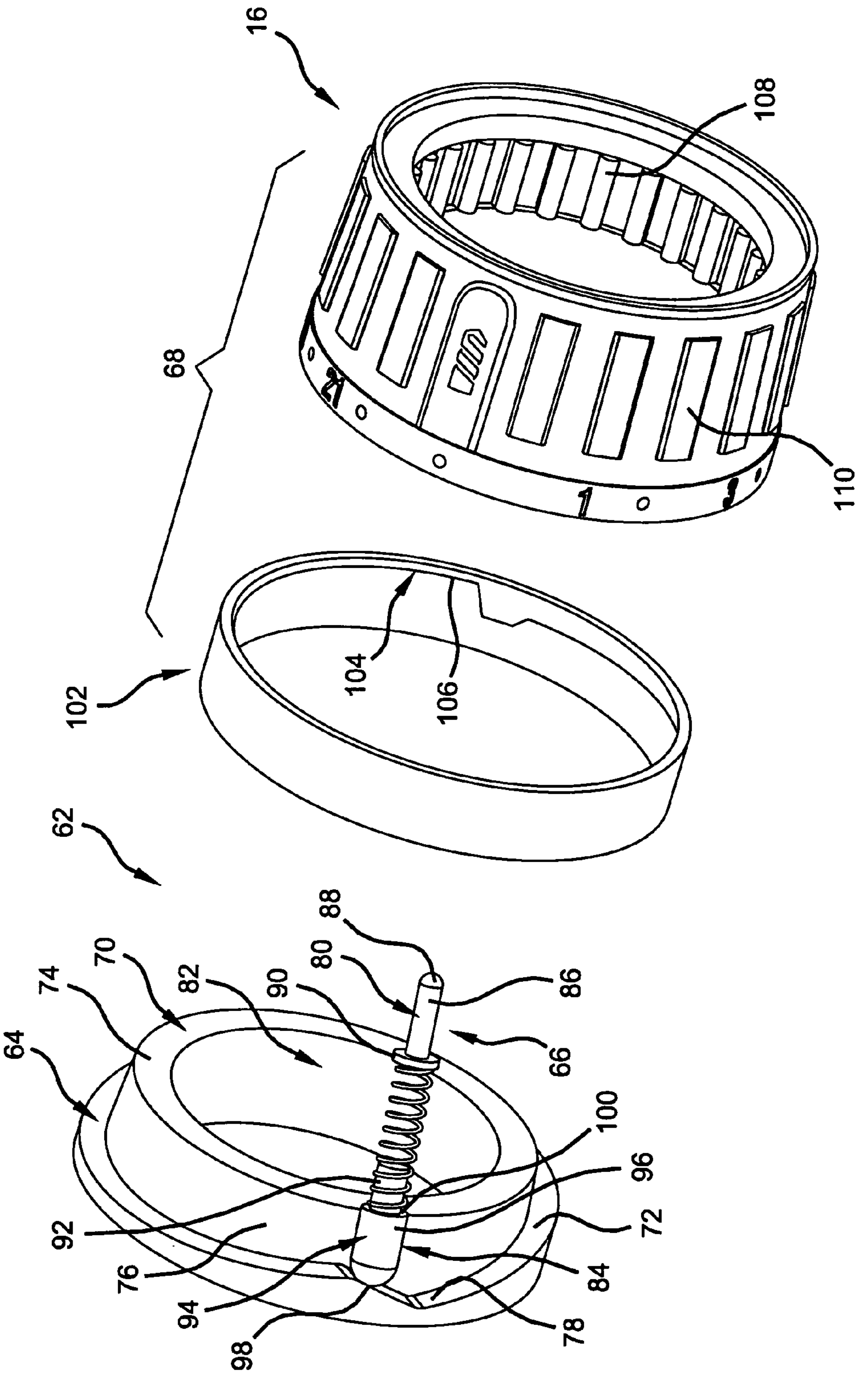
FIG. 6 is an exploded perspective view of a collar and clutch assembly for a tool.

FIG. 6 shows an exemplary clutch mechanism 62 that may be used in the present invention. The clutch mechanism 62 is shown to include a clutch member 64, an engagement assembly 66 and an adjustment mechanism 68. The clutch member 64 is shown to be an annular ring structure that is fixed to the outer diameter of a first ring gear 70 and which extends radially outwardly therefrom. The clutch member 64 includes a cammed clutch face 72 that is formed into the front surface 74 of the first ring gear 70. The outer diameter of the clutch member 64 is sized to rotate within a portion of a hollow cavity of the housing or gear case cover. The clutch face 72 of the example illustrated is shown to be defined by a plurality of peaks 76 and valleys 78 that are arranged relative to one another to form a series of ramps. Those skilled in the art will understand, however, that other clutch face configurations may also be employed, such as a sinusoidally shaped clutch face. Furthermore, while the first ring gear 70 and the clutch member 64 have been illustrated as a one piece (i.e., unitarily formed) construction, those skilled in the art will understand that they may be constructed otherwise.

In the particular embodiment illustrated, the engagement assembly 66 includes a pin member 80, a follower spring 82 and a follower 84. The pin member 80 includes a cylindrical body portion 86 having an outer diameter that is sized to slip-fit within an actuator aperture (not shown) that is formed in the housing or gear case cover. The pin member 80 also includes a tip portion 88 and a head portion 90. The tip portion 88 is configured to engage the adjustment mechanism 68 and in the example shown, is formed into the end of the body portion 86 of the pin member 80 and defined by a spherical radius. The head portion 90 is coupled to the end of the body portion 86 opposite the tip portion 88 and is shaped in the form of a flat cylinder or barrel that is sized to slip fit within the actuator aperture. Accordingly, the head portion 90 prevents the pin member 80 from being urged forwardly out of the actuator aperture.

The follower spring 82 is a compression spring whose outside diameter is sized to slip fit within the actuator aperture. The forward end of the follower spring 82 contacts the head portion 90 of the pin member 80, while the opposite end of the follower spring 82 contacts the follower 84. The end portion 92 of the follower 84 is cylindrical in shape and sized to slip fit within the inside diameter of the follower spring 82. In this regard, the end portion 92 of the follower 84 acts as a spring follower to prevent the follower spring 82 from bending over when it is compressed. The follower 84 also includes a follower portion 94 having a cylindrically shaped body portion 96, a tip portion 98 and a flange portion 100. The body portion 96 is sized to slip fit within the actuator aperture. The tip portion 98 is configured to engage the clutch face 72 and in the example shown, is formed into the end of the body portion 96 of the follower 84 and defined by a spherical radius. The flange portion 100 is formed at the intersection between the body portion 96 and the end portion 92. The flange portion 100 is generally flat and configured to receive a biasing force that is exerted by the follower spring 82.

The adjustment mechanism 68 is also shown to include an adjustment ring structure 102 and the collar 16. The adjustment ring structure 102 is shaped in the form of a generally hollow cylinder that is sized to fit around the gear case cover 14. The adjustment ring structure 102 includes an annular face 104 into which an adjustment profile 106 is formed. The follower 84 and a plurality of detents 108 that are formed into the adjustment mechanism 68 cooperate to provide the user of tool 10 with a tactile indication of the position of the adjustment profile 106 as well as inhibit the free rotation of the adjustment structure 102 so as to maintain the position of the adjustment profile 106.

The setting collar 16 is coupled to the exterior of the adjustment ring structure 102 and includes a plurality of raised gripping surfaces 110 that permit the user of the tool 10 to comfortably rotate both the collar 16 and the adjustment structure 102 to set the adjustment profile 106.

The magnitude of the clutch torque is dictated by the adjustment mechanism 68. Positioning of the adjustment mechanism 68 pushes the pin member 80 rearwardly in the actuator aperture, thereby compressing the follower spring 82 and producing a clutch force. The clutch force is transmitted to the flange portion 100 of the follower 84, causing the tip portion 98 of the follower 84 to engage the clutch face 72 and generating the clutch torque. Positioning of the tip portion 98 of the follower 84 in one of the valleys 78 in the clutch face 72 operates to inhibit rotation of the first ring gear 70 relative to the transmission when the magnitude of the clutch torque exceeds the first intermediate torque. When the first intermediate torque exceeds the clutch torque, however, the first ring gear 70 is permitted to rotate relative to the transmission. Depending upon the configuration of the clutch face 72, rotation of the first ring gear 70 may cause the clutch force to increase a sufficient amount to resist further rotation. In such situations, the first ring gear 70 will rotate in an opposite direction when the magnitude of the first intermediate torque diminishes, permitting the tip portion 98 of the follower 84 to align in one of the valleys 78 in the clutch face 72.

In operation of the tool 10, it is frequently desirable to change between two clutch settings, as when the tool 10 is used to both drill a hole and thereafter install a screw in that hole. Accordingly, the adjustment mechanism 68 may be rotated relative the gear case cover to position the adjustment mechanism 68. The adjustment mechanism 68 of the present invention is configured such that the adjustment structure 102 and the collar 16 are rotatable through an angle of 360°. Accordingly, the user of the tool 10 is able to vary the clutch setting from its maximum setting to its minimum setting (and vice versa) by rotating the collar 16 a relatively small amount.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tool comprising:

a housing having a handle portion, a motor portion and a forward portion;

a collar rotatably mounted adjacent said forward portion of said housing;

a secondary handle mounting portion non-rotatably mounted forward of said collar; and a chuck mounted forward of said secondary handle mounting portion.

2. The tool according to claim 1, further comprising a side handle mounted to said secondary handle mounting portion.

3. A tool comprising:

a housing having a handle portion, a motor portion and a forward portion;

a collar rotatably mounted adjacent said forward portion of said housing;

an annular surface portion non-rotatably mounted forward of said collar; and a chuck mounted forward of said annular surface portion.

4. The tool according to claim 3, further comprising a side handle mounted to said annular surface portion.

5. The tool according to claim 3, wherein an outer diameter of said chuck is smaller than an outer diameter of said annular surface portion and an outer diameter of said annular surface portion is smaller than an outer diameter of said collar.

* * * * *